Oct. 3, 1967
J. H. HERRERA
3,344,733
COFFEE-MAKING MACHINE
Filed March 3, 1966
2 Sheets-Sheet 1
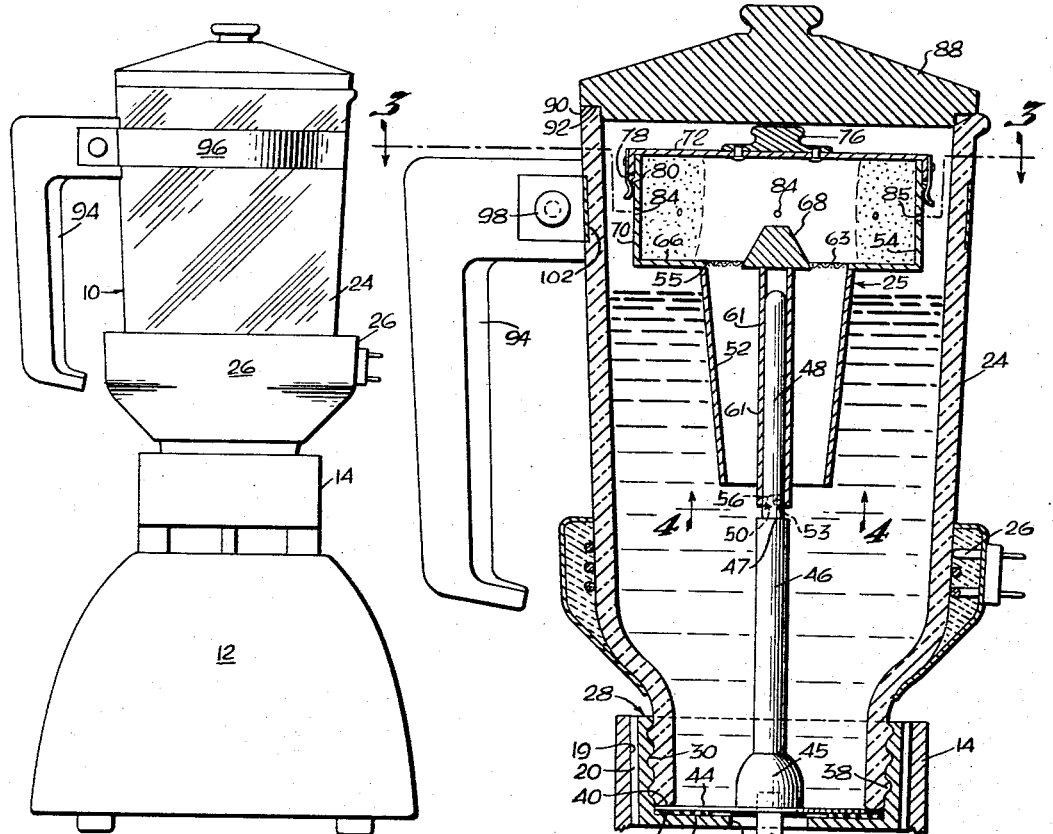
INVENTOR.
JUAN HERNANDEZ HERRERA
BY
ATTORNEY.

Oct. 3, 1967  J. H. HERRERA  3,344,733
COFFEE-MAKING MACHINE
Filed March 3, 1966  2 Sheets-Sheet 2

INVENTOR.
JUAN HERNANDEZ HERRERA
BY John Ajil Malley
ATTORNEY.

United States Patent Office 3,344,733
Patented Oct. 3, 1967

3,344,733
COFFEE-MAKING MACHINE
Juan Hernandez Herrera, Miami, Fla., assignor to Ultra-matic National Coffee Machine Inc., Hialeah, Fla., a corporation of Florida
Filed Mar. 3, 1966, Ser. No. 531,520
12 Claims. (Cl. 99—302)

This invention relates to a coffee-making machine, and, more particularly, to a coffee-making unit including a brewing container in which there is rotatably disposed in coaxial relation a centrifugal strainer and pump which are adapted to be driven as a unit by exterior drive means of the type commonly used in household blender machines.

In the past, it has been learned that coffee made from water of a temperature higher than that of the boiling point of water is not as pleasing as coffee made from water of a lower temperature because, at the higher temperature, certain acids and toxic elements are formed which are not present at a lower brewing temperature. It is an object of the present invention to teach a coffee-making machine adapted to be used in households with commonly encountered household equipment whereby coffee may be made from water of a temperature less than that of the boiling point. The coffee-making machine is adapted to be utilized on the conventional foundations or bases of household devices, such as mixers and blenders, simply by interchanging the unit with that of the blender unit—that is, repositioning it on the base.

Also, it is an object of the invention to teach a device which, in use in brewing coffee, captivates coffee grounds in a centrifugal strainer with the grounds being in a torus configuration in the form of a coffee ground slush in which the grounds float in water and are under pressure by reason of a direct connection with a centrifugal pump so that the individual coffee grounds are squeezed by a uniform pressure thereover as the grounds steep in a uniform circulation of heated water of a temperature below that of the boiling temperature of water.

It is another object of this invention to provide a coffee-making device of the type described hereinafter which is simple and inexpensive to manufacture and which will provide for an increased yield of coffee brew from coffee beans and which will have improved taste characteristics.

In accordance with these and other objects which will become apparent hereinafter, the instant invention will now be described with reference to the accompanying drawings illustrating a preferred embodiment thereof.

In the drawings:

FIG. 1 is a side elevation view of the instant invention applied to a blending device which houses a drive means and shaft;

FIG. 2 is a partial view in cross section of the portions of FIG. 1 which illustrate the instant invention;

FIG. 3 is a view in cross section taken along the planes indicated by the line 3—3 of FIG. 2 and looking in the direction of the arrows;

FIG. 4 is a view in cross section taken along the plane indicated by the line 4—4 of FIG. 2 and looking in the direction of the arrows;

Figure 5:
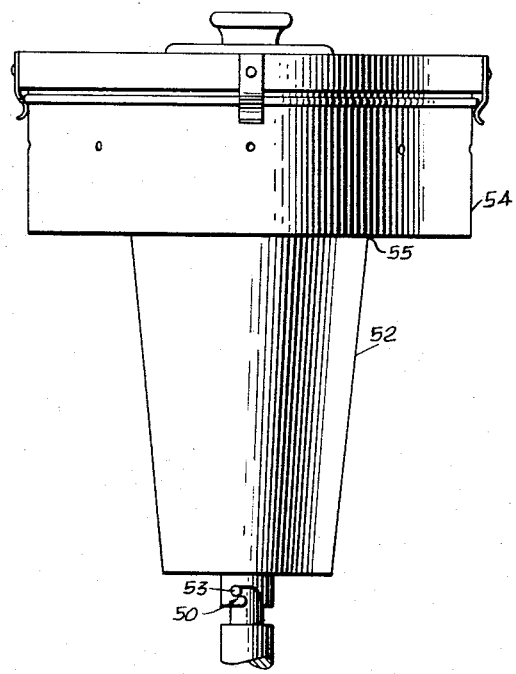
FIG. 5 is a side elevation view of the centrifugal strainer and pump which are incorporated in the unit illustrated in FIG. 2.

Referring to the drawings, wherein like reference characters designate like or corresponding parts throughout the different views, and referring particularly to FIG. 1, the numeral 10 generally designates the coffee-making unit mounted to a housing 12 in which drive means, not shown, are arranged to rotate a shaft 13. The shaft 13 extends vertically through the floor of a cup-shaped adapter of the housing, the side walls of which are internally grooved 19 to mate in spline type relation with vertical keys 20 of various household units such as a mixer, blender, or, in the case of the instant invention, a coffee-making unit or machine.

Referring to the coffee-making machine 10, which is seen in cross section in FIG. 2, it includes a brewing container 24, heating means 26 for the container, an internal assembly 25 including a rotatable shaft carrying a centrifugal pump and strainer, and a base 28 having the spline type keys 20 referred to above for inter-engagement with the grooves 19 of the adapter 14.

As is apparent from the drawing, the brewing container 24 and the cup-shaped base 28 are threadably assembled, the base including an interiorly threaded wall portion 30 and a floor 32 with a central hole 33 for penetration by the end of the drive shaft. The lower end of the brewing container 24 is threaded as at 38 for the aforesaid threaded engagement with the wall of the base 28, and to nestle snugly on the floor 32, a gasket of rubbery material 34 and an overlaying annular bearing plate 44 are provided and, when the container and base are threadably assembled are pressed together into fluid tight sealing relation between the leading edge 40 of the threaded end of the container and the floor 32. When thus assembled, the annular bearing plate is captivated between the gasket and the leading edge of the brewing container; a thimble type cover 45 is carried on the plate 44 and houses a fluid tight bearing for the rotatable shaft 46 and provides means for connection of the shaft 46 of the assembly 25 to the driven shaft 13 exterior of the housing.

The assembly 25, which is the rotatable infusion portion of the unit, includes the aforesaid shaft 46 which is provided with a shoulder 47 intermediate the length thereof with a distal portion 48 of reduced diameter on which there is mounted by means of a driving connection 50 the pump 52 and strainer 54. In the embodiment shown, the driving connection 50 comprises a laterally or radially projecting pin 53 to connect in a circumferential slot of the core wall of the pump 52. As is seen in more detail in FIGS. 3, 4 and 5, the pump and strainer element 52 and 54 respectively are connected together as a rotatable unit by welding or other suitable fashion as indicated at their line of juncture designated by the numeral 55. The pump 52 is generally of an inverted, truncated cone configuration defining an internal annular chamber between the core wall 61 and the outer wall, which chamber is divided by means of a lateral reinforcing web 58. It is apparent that the lower mouth end of the pump is of a smaller cross-section than the upper discharge end which discharges water into the centrifugal strainer portion through the barrier or screen member 63. Referring to the strainer 54, it is seen to define a cylindrical chamber of circular cross section having a floor 66, a portion of which is composed of the screen barrier 63 and which connects the core plug 68 to the preferably vertical or axially extending strainer wall 70 which is spanned by means of a lid 72. In the embodiment shown the lid 72 is provided with a handle 76 and a spring-biased retaining ring 78 to resiliently engage an annular raised portion 80 on the periphery of the side wall. As can be seen in FIG. 2, the side wall is provided with a plurality of holes, such as 84, the walls of which preferably taper radially from a constricted mouth 85 to an enlarged outer rim.

A suitable cover 88 is provided with a circumferential shoulder 90 to provide a seat for the projecting lip 92 of the container. Also, the container is provided with a suitable handle 94 which in the embodiment shown is connected to the container by means of a tension strap 96 which is drawn together by means of a screw 98 when the ring strap is seated in an annular groove 102 in the container. The heating means are simply of any suitable type to provide heat to water in the container.

In operation, the container is filled with water and a charge of coffee is positioned in the strainer. Thereafter, the water is heated to a temperature which is less than the boiling point of water but which is still quite hot. A conventional thermostat may be provided to control the temperature. On rotation of the shaft 13 which in turn will cause the assembly 25 to rotate, water will be pumped up through the pump 52 and passed through the screen into the centrifugal strainer to there mix with the coffee grounds which in turn will be thrust radially outwardly to form a torus shaped cake of a slush-type mixture of coffee grounds and water under pressure. Some of the water will pass out of the holes 84 and this will be replaced by further water pumped up by the pump 52 until equilibrium is reached. In the slush-type cake it is believed that the coffee grounds are in a suspended state with the pressure of the water being built up between the wall, the floor and the roof and distributed equally over the individual particulate elements of the coffee grounds to squeeze them while the coffee steeps as a continuous circulation takes place by reason of the water passing out of the holes 84 to be replaced by additional water pumped up from the container reservoir.

Figure 6:
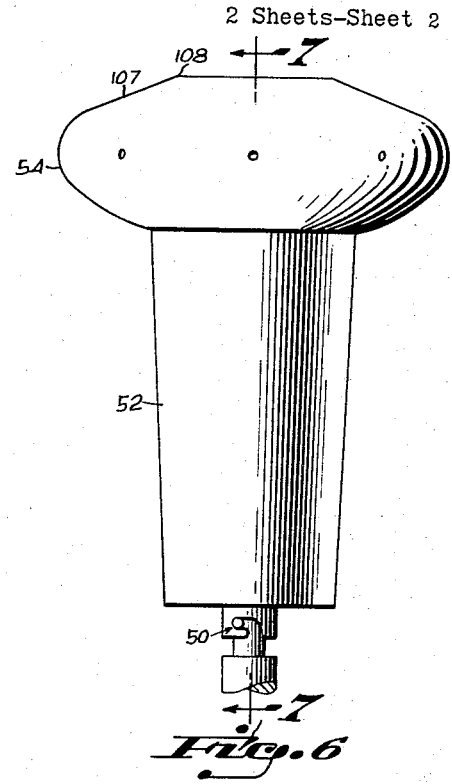
FIG. 6 is a view similar to that of FIG. 5 of an alternative embodiment of the centrifugal strainer and pump.
Figure 7:
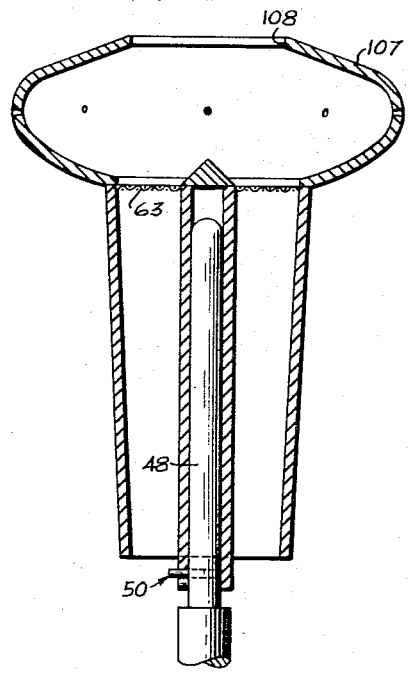
FIG. 7 is a view in cross section taken along the plane indicated by the line 7—7 of FIG. 6 and looking in the direction of the arrows.
Figure 8:
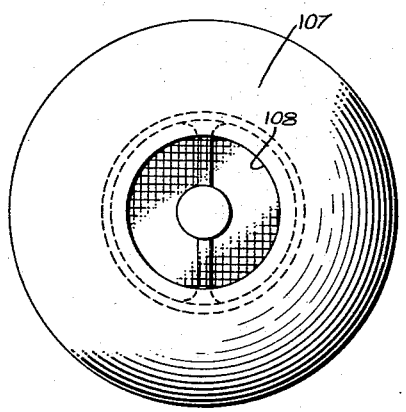
FIG. 8 is a plan view of FIG. 7.

Referring to FIGS. 6, 7 and 8, a somewhat modified version of the instant invention is shown. The elements of this embodiment have been designated by similar numerals to that shown in the embodiment of FIG. 2. In this embodiment the side walls are curved inwardly to form a roof 107 which, by reason of the radial thrust of the centrifugal forces, serves to hold the coffee water slush in the strainer without the need for a cap for the lip 108.

It has been found that the holes 84 are preferably of a smallest diameter of not more than one sixty-fourth of an inch and of a largest diameter of not more than one thirty-second of an inch and it is preferred that the holes be in a common lateral plane and that this lateral plane be at about the center of the height of the strainer as shown. It has been found that the radial thickness of the torus is preferably less than one inch thick and that the height of the torus is of preferably not more than one inch on either side of the common plane in which the centers of the holes are located so that circulation of the water through the torus takes place as the coffee grounds and water mix under the forces of rotation and the grounds tend to float in the water under pressure with a slight squeezing taking place as the grounds steep in the hot water. In a preferred embodiment, the number of holes is such that each 45-degree segment of the torus of a strainer of approximately eight inches diameter is provided with a hole so that the hole permits of a gentle and continuous circulation through each of the respective less than one inch radially thick segments. With respect to the alternative embodiment shown in FIGS. 6, 7 and 8, the same equivalent preferred proportions exist; however, it is understood that the particular curve which characterizes the side wall of the strainer will determine the cross-sectional area of the segments and, consequently, the volume of the mixture of the coffee grounds and the water comprising the torus shaped batch of steeping coffee.

In the embodiment shown, the plane of the holes is approximately the medial plane heightwise of the strainer. It is preferred that the plane of these openings or holes be at least at the height of the medial plane so that most of the water pumped upwardly will be circulated through a relatively high percentage of the internal area of the aforesaid torus. It has also been found that if the plane of the holes is adjacent the terminal upper end of the side walls a pleasing brew is obtained. This is believed to be for the reason that the water pumped through the torus is caused to travel substantially all the way through the torus. Further, it has been found that holes need not necessarily be provided if a filtering media not shown is imbedded between the terminal end of the side walls of the strainer and the downwardly extending lip or rim of the cap slightly spaced radially outwardly a slightly greater distance than the outside diameter of the lip of the strainer so that brew may filter through the void at the upper corner around the periphery of the line of juncture between the side walls of the strainer and cap.

Although not shown in the drawings, it is contemplated to be within the scope of this invention to provide a cone-shaped member comprising the pump at the lower end and the strainer at the upper end with the walls being of a common slope with a lateral screen separating the cone into the strainer portion and the pump portion. This provides for an improved construction in the sense that it will be less expensive to manufacture. With respect to the embodiment of FIGS. 6, 7 and 8, it has been found that the entrance diameter to the pump, that is, the entrance at the lower end of the pump, should be slightly larger than the diameter of the upper opening 108 in order that the inside diameter of the torus will be located radially outwardly of the edge designated by the numeral 108 and the grounds of the coffee will in effect be trapped within the strainer without the need of a cap. Also, the strainer may be provided with a filter (not shown) to overlay the outer peripheral side walls of the strainer so that in the event that the holes are larger than a preferred size of not more than one sixty-fourth of an inch the filter will, by reason of the fact that it will have passages of less than one sixty-fourth of an inch, prohibit passage of the coffee grounds into the main brewing chamber.

It has been found that the brewing of coffee using the instant invention produces a delightfully tasting brew which is not characterized by the acidity which takes place in coffee made with water above 212 degrees Fahrenheit.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A coffee-making machine comprising: a brewing container for water and including a base portion with a shaft rotatable in the container and adapted to be driven by drive means exterior of the container; a centrifugal pump mounted for rotation with the shaft, said pump having an inlet end of a first cross-sectional area and an outlet end of a second and larger cross-sectional area, said ends being below and above the normal water line of the container respectively with the cross-sectional area of the pump between the said ends increasing between the said ends to effect raising of water above the water line on rotation of the pump, a centrifugal strainer connected to and coaxial with the pump in fluid communicating relation with the outlet end of the pump and defining an annular chamber to receive a batch of infusion material, barrier means between the strainer and the outlet end of the pump to support a batch in the strainer while permitting flow of water from the pump into the strainer, said annular chamber being defined by a side wall having a roof portion, said strainer having a plurality of openings so that on rotation of the pump at a relatively constant angular velocity, a batch of coffee grounds in the strainer will be thrust radially outwardly against the side wall beneath the roof portion defining a torus of slush type consistency with the particulate material of the slush steeping in the torus and the brew which passes out of the openings is continuously replaced by liquid from the brewing container, the said lateral openings being arranged in a symmetrical pattern with all of the openings being of a diameter not more than one sixty-fourth of an inch, and means to heat water in the container.

2. A coffee-making machine as set forth in claim 1 wherein all of the said openings are in a common plane at or above the medial plane of the annular chamber.

3. A coffee-making machine as set forth in claim 2 wherein all of the openings are in a common lateral plane at or above the medial plane of the annular chamber.

4. A coffee-making machine as set forth in claim 1 wherein the said holes are spaced apart from one another between two and four inches on the periphery of the strainer.

5. A coffee-making machine as set forth in claim 4 wherein a recess is provided in the roof portion symmetrical with respect to the main axis of the coffee making machine and of a diameter at least slightly less than the said inlet end of a first cross-sectional area.

6. A coffee-making machine as set forth in claim 1 wherein the said container is provided with a base adapted to be connected to an adapter of a housing for a drive means to rotate a shaft.

7. A coffee-making machine as set forth in claim 6 wherein the roof portion of the side wall comprises a cap adapted to be removed from the strainer.

8. A coffee-making machine as set forth in claim 6 wherein the pump is provided with a center core for telescoping engagement with the shaft in the container and mutually interco-operating connecting means are provided to drivingly connect the pump to the shaft.

9. A coffee-making machine as set forth in claim 1 wherein the roof portion of the side wall comprises a cap adapted to be removed from the strainer.

10. A coffee-making machine as set forth in claim 9 wherein the pump is provided with a center core for telescoping engagement with the shaft in the container and mutually interco-operating connecting means are provided to drivingly connect the pump to the shaft.

11. A coffee-making machine as set forth in claim 1 wherein the pump is provided with a center core for telescoping engagement with the shaft in the container and mutually interco-operating connecting means are provided to drivingly connect the pump to the shaft.

12. A coffee-making machine as set forth in claim 1 wherein the interior of the chamber is accessible by means of a removable cap member.

References Cited

UNITED STATES PATENTS

| 1,984,047 | 12/1934 | Thieme | 99—302 |
| 2,355,094 | 8/1944 | Moore | 99—287 |
| 2,414,521 | 1/1947 | Gunther | 99—287 |
| 2,480,921 | 9/1949 | Hahn | 99—287 |
| 2,858,762 | 11/1958 | Wade | 99—287 |

WALTER A. SCHEEL, *Primary Examiner.*

R. W. JENKINS, *Assistant Examiner.*